US012102852B2

(12) United States Patent
Tralau

(10) Patent No.: US 12,102,852 B2
(45) Date of Patent: Oct. 1, 2024

(54) OXYGEN SELF-RESCUER AND PROCESS FOR AN OXYGEN SELF-RESCUER

(71) Applicant: Dräger Safety AG & Co. KGaA, Lübeck (DE)

(72) Inventor: Timo Tralau, Lübeck (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 639 days.

(21) Appl. No.: 17/357,109

(22) Filed: Jun. 24, 2021

(65) Prior Publication Data

US 2021/0402220 A1 Dec. 30, 2021

(30) Foreign Application Priority Data

Jun. 30, 2020 (DE) ..................... 10 2020 117 130.7

(51) Int. Cl.
*A62B 7/00* (2006.01)
*A62B 7/02* (2006.01)

(52) U.S. Cl.
CPC . *A62B 7/00* (2013.01); *A62B 7/02* (2013.01)

(58) Field of Classification Search
CPC ... A62B 7/00; A62B 7/02; A62B 7/08; A61M 16/0078; A61M 16/0084
See application file for complete search history.

(56) References Cited

U.S. PATENT DOCUMENTS

| | | | | | |
|---|---|---|---|---|---|
| 1,532,654 | A * | 4/1925 | Bernhard | A62B 7/10 | 128/205.16 |
| 1,533,172 | A * | 4/1925 | Bernhard | A62B 9/00 | 128/205.16 |
| 2,428,425 | A * | 10/1947 | Levitt | A62B 7/02 | 128/207.14 |
| 2,507,450 | A * | 5/1950 | Millikan | A62B 7/08 | 128/202.26 |
| 3,316,903 | A * | 5/1967 | Richards | A61M 16/0084 | 128/205.16 |
| 3,530,857 | A * | 9/1970 | Miczka | A62B 7/02 | 128/205.13 |

(Continued)

FOREIGN PATENT DOCUMENTS

| | | | |
|---|---|---|---|
| CN | 105498109 | A | 4/2016 |
| DE | 1261403 | B | 2/1968 |

(Continued)

*Primary Examiner* — Kathryn E Ditmer
(74) *Attorney, Agent, or Firm* — McGlew and Tuttle, P.C.

(57) ABSTRACT

An oxygen self-rescuer (100) includes a gas cartridge (110), a mouthpiece (120), a tube (130) connecting the gas cartridge and the mouthpiece, a breathing bag (140) hydrodynamically connected to the gas cartridge and to the tube, and a spring assembly (150) within the breathing bag. The spring assembly includes a spring (153) fastened to the breathing bag and/or to the gas cartridge. The spring assembly has a pretensioned spring state in an unused packed-up state of the oxygen self-rescuer. The spring assembly leaves the pretensioned spring state with an externally triggered transition from the unused packed-up state into a use expanded state of the oxygen self-rescuer such that the spring assembly uplifts the breathing bag and generates a vacuum within the breathing bag. The vacuum draws breathable gas into the breathing bag and prepares the breathing bag for a ventilation of a user of the oxygen self-rescuer.

17 Claims, 5 Drawing Sheets

(56) References Cited

U.S. PATENT DOCUMENTS

| | | | | | |
|---|---|---|---|---|---|
| 3,565,068 | A | | 2/1971 | Bickford | |
| 3,613,677 | A | * | 10/1971 | Blasko | A61M 16/0084 128/205.16 |
| 3,938,512 | A | * | 2/1976 | Mausteller | A62B 7/08 128/202.26 |
| 4,440,163 | A | * | 4/1984 | Spergel | A62B 18/04 128/205.21 |
| 4,757,813 | A | * | 7/1988 | Haydu | A62B 17/04 128/201.26 |
| 4,817,597 | A | | 4/1989 | Tanaka | |
| 4,821,712 | A | * | 4/1989 | Gossett | A62B 7/02 128/205.15 |
| 5,492,114 | A | * | 2/1996 | Vroman | A62B 18/08 128/205.13 |
| 5,524,616 | A | * | 6/1996 | Smith | A62B 9/00 128/205.27 |
| 6,283,121 | B1 | * | 9/2001 | Fukutomi | A61M 16/0075 128/205.15 |
| 2017/0021204 | A1 | * | 1/2017 | Baek | A62B 23/02 |
| 2020/0376216 | A1 | * | 12/2020 | Salman | A61M 16/0084 |

FOREIGN PATENT DOCUMENTS

| | | | | | |
|---|---|---|---|---|---|
| DE | 3617327 | A1 | * | 11/1987 | |
| DE | 19652074 | A1 | | 6/1998 | |
| DE | 102005001942 | A1 | * | 7/2006 | A61M 16/0057 |
| DE | 102016000268 | A1 | * | 7/2017 | A62B 7/02 |
| DE | 102017011582 | A1 | | 6/2019 | |
| KR | 100227469 | B1 | * | 11/1999 | |
| KR | 20040087774 | A | | 10/2004 | |
| KR | 20170111023 | A | * | 10/2017 | |
| WO | WO-9922988 | A1 | * | 5/1999 | A62B 7/02 |

* cited by examiner

OXYGEN SELF-RESCUER AND PROCESS FOR AN OXYGEN SELF-RESCUER

CROSS REFERENCE TO RELATED APPLICATIONS

This application claims the benefit of priority under 35 U.S.C. § 119 of German Application 10 2020 117 130.7, filed Jun. 30, 2020, the entire contents of which are incorporated herein by reference.

TECHNICAL FIELD

The present invention pertains to an oxygen self-rescuer and to a process for setting up a breathing bag of an oxygen self-rescuer during a transition from an unused packed-up state of the oxygen self-rescuer into a use (to be used) expanded state of the oxygen self-rescuer.

TECHNICAL BACKGROUND

The use of an oxygen self-rescuer is known, for example, in the mining industry. This oxygen self-rescuer is thus used in case of the sudden occurrence of toxic fumes to make oxygen available to the user for a short period of time, so that the user can further inhale non-toxic oxygen on the user's way out of the toxic fumes into an area with fresh air. Since such accidents with toxic fumes being released rarely occur, such an oxygen self-rescuer will usually be carried over a long period of several years before it is used or replaced.

Since the user usually cannot remember the contents of directions for use in such an alarm situation, the use of the oxygen self-rescuer must be carried out intuitively and robustly against user errors.

The structure of an oxygen self-rescuer, consisting of a breathing bag, a mouthpiece and a tube part, which connects the mouthpiece to the breathing bag, is known, in principle.

A manually actuatable starting device being provided in such an arrangement for producing oxygen is described in DE 196 52 074 A1. This oxygen is brought into the breathing bag in order thereby to be inhalable via the mouthpiece for the user.

Furthermore, the use of a chlorate candle that releases oxygen in an exothermic reaction is known, whereby this oxygen is likewise brought into the breathing bag. The chlorate candle is activated by the user exhaling into the breathing bag.

SUMMARY

An object of the present invention is to provide an improved oxygen self-rescuer, and especially an oxygen self-rescuer that is especially robust and simple to operate.

An oxygen self-rescuer with a gas cartridge, with a mouthpiece, with a tube (hose) connecting the gas cartridge and the mouthpiece, with a breathing bag, which is hydrodynamically connected to the gas cartridge and to the tube, and with a spring assembly, is provided according to the present invention for accomplishing this object.

The spring assembly is arranged within the breathing bag, wherein the spring assembly comprises at least one spring, which is fastened to the breathing bag and/or to the gas cartridge, and wherein the spring assembly is present in a pretensioned spring state in an unused packed-up state of the oxygen self-rescuer. In this connection, the spring assembly leaves the pretensioned spring state during an externally triggered transition from the unused packed-up state of the oxygen self-rescuer into a use (to be used) expanded state of the oxygen self-rescuer such that the spring assembly tilts up (uplifts—erects) the breathing bag and in the process generates a vacuum within the breathing bag, so that the vacuum guides (draws) breathable gas into the breathing bag and as a result prepares this breathing bag for a ventilation of a user of the oxygen self-rescuer.

It was found within the framework of the present invention that a ventilation of the user should take place more intuitively than this is the case in common oxygen self-rescuers. In particular, it should be avoided that the oxygen self-rescuer can first be used by an initial exhalation into the breathing bag, since a user could intuitively try in vain to inhale breathable gas directly. It was found against this background that it is necessary to mechanically tilt up (uplift) the breathing bag, so that the user does not initially breathe against any resistance, but rather can continue the user's usual breathing rhythm right from the start. The spring assembly, which ensures a reliable, mechanical tilting up (uplifting) of the breathing bag during transition into the use expanded state of the oxygen self-rescuer, is proposed according to the present invention for accomplishing this object.

The oxygen self-rescuer according to the present invention therefore advantageously makes possible an automated mechanical uplifting of the breathing bag, even after the oxygen self-rescuer has been in the unused packed-up state for many years. Even if the breathing bag should continue to be comparatively rigid in the unused packed-up state because of its material properties, the spring assembly allows, without additional efforts by the user, a reliable transition into the use expanded state of the oxygen self-rescuer. In particular, an especially powerful blowing into the breathing bag, as could be necessary in case of commercially available oxygen self-rescuers, is avoided.

The present invention is especially robust due to the use of a pretensioned spring assembly, since the pretensioned spring state in case of the metallic materials preferably used for such a spring assembly reliably maintains for many years a spring action, which, externally triggered, ensures the transition into the expanded state and the leaving of the tensioned spring state.

The transition from the unused state into the use state of the oxygen self-rescuer can be triggered, for example, externally by the removal of the oxygen self-rescuer from a casing, for example, from a pouch, a shell, a canister or another such casing. The need for such a manual removal can be indicated, for example, for the user by an alarm at the user's working area.

The uplifting of the breathing bag by the spring assembly makes available a breathable gas volume, which can be inhaled at least to some extent by the user of the oxygen self-rescuer by applying the mouthpiece. The gas cartridge provides according to the present invention an oxygen-containing gas, which is guided into the breathing bag and protects the user from having to exclusively inhale the user's own exhaled air beyond a plurality of breaths. The gas cartridge can in the process be activated, for example, via the inhaled air of the user, via a manual operation or via a process correlated with the externally triggered transition, in order to provide the oxygen-containing gas after the activation.

The hydrodynamic connection between the breathing bag, gas cartridge and tube is configured such that the oxygen-containing gas, which is provided by the gas cartridge in the breathing bag, can be inhaled via the mouthpiece at the tube.

Moreover, this hydrodynamic connection makes it possible for the vacuum generated by the uplifting of the breathing bag to guide breathable gas from the surrounding area of the oxygen self-rescuer directly into the breathing bag. The fact that toxic gas is possibly present in the surrounding area is not problematic here since only a single further breath is carried out with the ambient air, which is probably not immediately enriched with toxic gas.

The velocity, with which the breathing bag is uplifted (tilted up) by the spring assembly, is dependent on the pretension of the spring assembly in the pretensioned spring state. The pretension is preferably selected such that the breathing bag is sufficiently uplifted, for example, directly after the removal from a corresponding casing for the oxygen self-rescuer in order to make it possible for the user to inhale.

Furthermore, the reusability of the spring assembly for uplifting the breathing bag after a single use of the oxygen self-rescuer is advantageous for the use of a spring assembly. Only the pretensioned spring state has to be provided again and be fixed, for example, by a suitable casing, in order to be able to use the spring assembly again according to the present invention. Only a replacement of the gas cartridge is preferably necessary for a reuse of the oxygen self-rescuer.

The precise configuration of a suitable gas cartridge is known to the person skilled in the art in light of the gas cartridges already commercially available and will therefore not be explained in detail below.

Preferred embodiments of the oxygen self-rescuer according to the present invention are described below.

In an especially preferred embodiment of the oxygen self-rescuer, the spring assembly has a flat shape in the pretensioned spring state such that a low inner volume of the breathing bag compared to the use expanded state is supported by the pretensioned state, and especially that a small packed size of the oxygen self-rescuer in the unused packed-up state compared to the use expanded state is supported. The spring assembly is preferably essentially flat in the pretensioned spring state and is larger in the expanded state than in the pretensioned spring state in at least one direction in space. It is hereby advantageously made possible that the breathing bag is stretched into the one direction in space, in which the expanded spring state of the spring assembly is larger than in the pretensioned state, and as a result generates a vacuum, which guides (draws) breathable gas from the ambient air into the breathing bag.

In an especially preferred embodiment, the spring assembly uplifts the breathing bag between the pretensioned spring state and a relaxed spring state of the spring assembly, wherein the breathing bag is not uplifted by the spring assembly in the finally present relaxed spring state. In this case, it is especially advantageously ensured that the user does not have to breathe against the resistance of the spring assembly when inhaling the breathable gas from the breathing bag. According to the present invention, in this embodiment the breathing bag is uplifted, so that a gas volume is made available to a user for inhaling, but the tilted up (uplifted) form of the breathing bag is no longer supported by the spring assembly after the spring assembly has reached its relaxed spring state. A support of the breathing bag by the spring assembly is, however, also no longer necessary after an initial uplifting, since a breathable gas introduced at the beginning keeps the breathing bag uplifted at least to some extent and then the breathing bag routinely changes it shape in the course of the ventilation of the user, without having to be uplifted again in the process.

In one advantageous embodiment, the spring assembly has at least two legs of the spring assembly, which legs are movable in relation to one another, wherein the two movable legs are arranged in the pretensioned spring state relative to one another such that a torsion spring arranged between the two legs is in a pretensioned state. Preferably, the legs move in relation to one another during the transition from the pretensioned spring state into the relaxed spring state such that the torsion spring reaches a relaxed state. The use of a torsion spring with at least two legs is advantageous since such a spring assembly can be manufactured in an especially simple and effective manner. The spring assembly of this embodiment preferably consists of a metal. A compression spring is used instead of a torsion spring in an alternative or additional embodiment.

In a preferred variant of the preceding embodiment, the two legs are configured as acute-angled to one another in the pretensioned spring state, wherein the two legs are configured as obtuse-angled or stretched to one another in the relaxed spring state. Such a transition from an acute-angled arrangement to an obtuse-angled arrangement makes it possible, in an arrangement existing between them, for the breathing bag to be at least partially uplifted due to the pressure of at least one of the two legs.

In a preferred embodiment, the spring assembly has two opposing springs, especially two opposing torsion springs, which form a pair of springs of the spring assembly. Such a spring assembly is able to uplift the breathing bag in an especially rapid and reliable manner, especially to tilt it up after a storage time of many years in the pretensioned spring state. The spring assembly has more than two torsion springs in a variant of this embodiment. The oxygen self-rescuer has especially preferably a spring assembly, which comprises at least two pairs of springs, in this embodiment. Compared with one pair of springs, more spring action can hereby be made possible for uplifting the breathing bag. Furthermore, the use of at least two pairs of springs makes possible a uplifting of the breathing bag in different directions. Finally, the use of a plurality of pairs of springs makes possible a certain failure safety in case one torsion spring is broken, for example, during the storage. Furthermore, it is possible by means of a plurality of pairs of springs to avoid the breathing bag from bonding to itself, for example, because of adhesion forces and from hereby providing a reduced inner volume. For example, FIG. 7 shows such a spring assembly, which uplifts the breathing bag via a plurality of pairs of springs in an especially reliable manner even against any adhesion forces present.

In an especially preferred variant of the preceding embodiment and/or in an especially preferred example of the preceding variant, the spring assembly between the two springs of at least one pair of springs has an arched, triangular, rectangular or U-shaped configuration. Such a structure of the spring assembly makes possible an especially robust configuration of the oxygen self-rescuer. In particular, such a structure makes possible a distributed force acting on the breathing bag, which stresses the material of the breathing bag less than a concentrated acting force by only one leg of the spring assembly. In an example of this variant, a plate, which uplifts the breathing bag during the externally triggered transition into the use expanded state, can be arranged above the at least two legs of the spring assembly and the arch shape, triangular shape, rectangular shape or U shape.

The spring assembly preferably has a one-piece configuration. Such a one-piece spring assembly can be manufactured in an especially simple manner and is especially robust in its application. In particular, no connection between components of the spring assembly is necessary, which possibly has a defect, for example, it breaks in the course of the years of storage. The spring assembly is preferably formed from at least one metallic wire.

In one embodiment according to the present invention, the spring assembly is fastened to a housing of the gas cartridge. As a result, an especially robust and reliable fastening of the spring assembly within the oxygen self-rescuer is possible. The spring assembly is connected to the housing of the gas cartridge preferably via a chemical or frictional connection, especially via a screw connection, a welded connection or a bonding.

In an especially preferred embodiment, the vacuum guides breathable gas into the breathing bag via the mouthpiece, via the gas cartridge and/or via a breathing bag valve. The breathing bag valve is preferably a valve provided at the breathing bag, which makes possible a gas exchange between the surrounding area and the inner volume of the breathing bag in at least one direction. The breathing bag valve is especially preferably a valve, which allows both a gas stream from the surrounding area into the breathing bag in order to guide (draw) breathing gas into the breathing bag when the vacuum is present and allows a gas stream from the breathing bag into the surrounding area in order to avoid, for example, an overpressure within the breathing bag. A gas stream into one of the two directions is preferably allowed by the breathing bag valve only if a minimum gas pressure is present in the respective direction. The breathing bag valve is preferably a combination of an overpressure valve and vacuum valve in this sense. In an additional and/or alternative variant, the breathing bag has both an overpressure valve and a vacuum valve. Even in case of only one possible gas stream direction of the breathing bag valve, the gas stream is preferably allowed only if a minimum gas pressure is present for the one possible direction.

The breathing bag is preferably formed from a polyurethane foil. As a result of this, the breathing bag is advantageously especially robust. As an alternative or in addition, the breathing bag is formed from a laminated fabric, especially from a laminated fabric, which has threads, which are electrically conductive. Due to electrically conductive threads, the breathing bag has an antistatic configuration. An electrical charging of the breathing bag is hereby avoided.

The present invention further pertains to a system consisting of the oxygen self-rescuer according to at least one of the preceding embodiments and of a casing of the oxygen self-rescuer. In this case, the casing of the oxygen self-rescuer is configured to provide for the unused packed-up state of the oxygen self-rescuer a durable container, in which the spring assembly remains in the pretensioned spring state. In particular, the casing, because of its dimension, is configured to enclose the packed size of the oxygen self-rescuer in the unused packed-up state, whereas the oxygen self-rescuer cannot be arranged within the casing in the use expanded state of the oxygen self-rescuer.

The casing is preferably a pouch, a box, a canister, a closed bag or the like. The casing is preferably formed from a material that is robust and resistant to environmental effects, for example, from a metal or from a plastic.

According to another aspect of the present invention, a process for setting up a breathing bag of an oxygen self-rescuer during a transition from an unused packed-up state of the oxygen self-rescuer into a use expanded state of the oxygen self-rescuer is provided for accomplishing the above-mentioned object. The process according to the present invention has the steps described below:

provision of a spring assembly in a pretensioned spring state of the spring assembly within the breathing bag for the unused packed-up state of the oxygen self-rescuer;

fixing of the oxygen self-rescuer in the unused packed-up state;

triggering of the transition into the use expanded state of the oxygen self-rescuer; and automated leaving of the pretensioned spring state by the spring assembly because of a spring action of at least one spring of the spring assembly such that the spring assembly uplifts the breathing bag and in the process generates a vacuum within the breathing bag, so that the vacuum guides (draws) breathable gas into the breathing bag and as a result prepares this breathing bag for a ventilation of a user of the oxygen self-rescuer.

The process according to the other aspect of the present invention has the advantages of the oxygen self-rescuer according to the present invention. Automatic leaving of the pretensioned spring state by the spring assembly especially makes possible an especially simple use of the spring assembly, in particular an especially simple carrying out of the process according to the present invention, since no additional manual step, besides the triggering, preferably the manual triggering, of the transition into the use expanded state of the oxygen self-rescuer is necessary.

In a preferred embodiment of the process according to the present invention, a final step comprises the reaching of a finally present relaxed spring state of the spring assembly, in which the breathing bag is not uplifted by the spring assembly. In this embodiment, it is advantageously avoided that the user of the oxygen self-rescuer has to breathe against the spring action of the spring assembly during the ventilation. Thus, the breathing bag in this embodiment is uplifted to bring breathable gas into the breathing bag by means of a vacuum generated in the process, but this breathable gas can be exhaled by the user from the breathing bag, without breathing against the tilted-up spring assembly, since a uplifting by the spring assembly is no longer present in the relaxed spring state of the spring assembly.

The present invention shall now be explained in more detail on the basis of advantageous exemplary embodiments, which are schematically shown in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
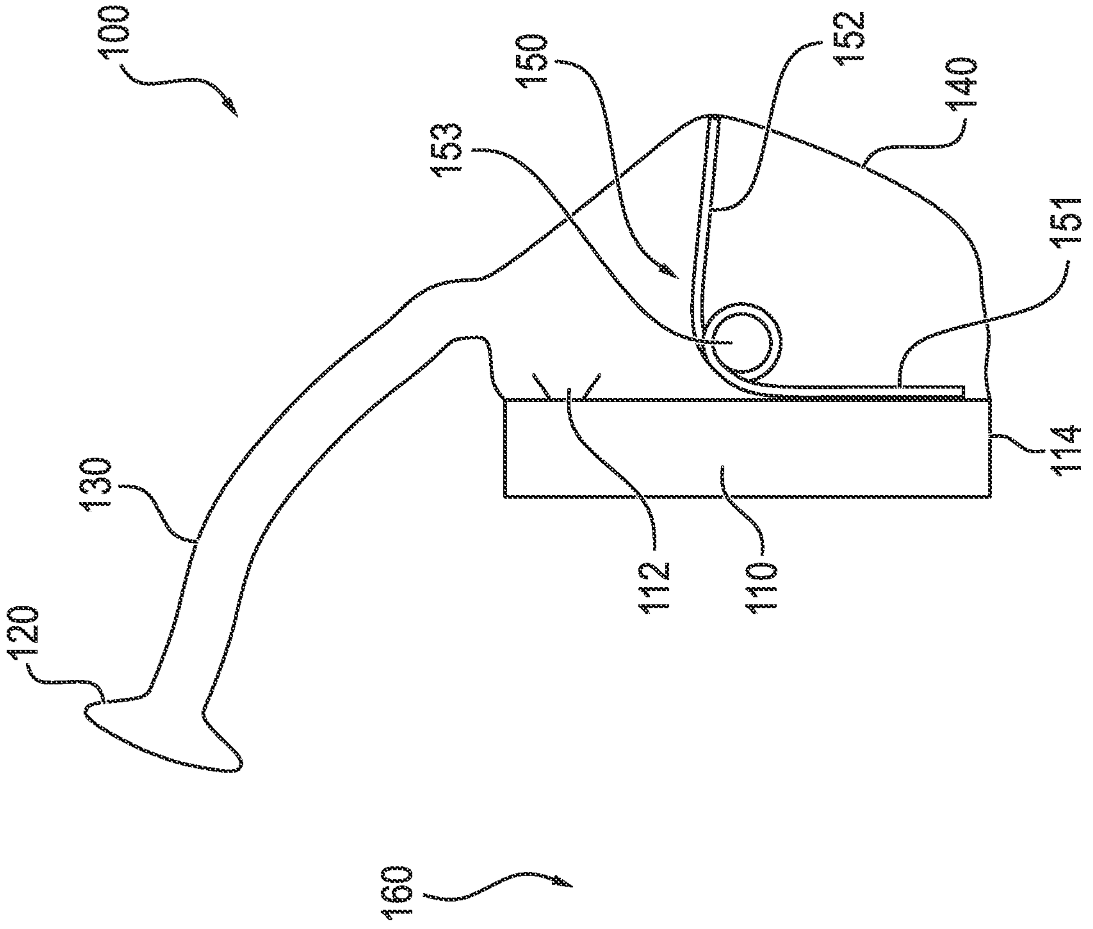
FIG. 1 is a schematic view showing a first exemplary embodiment of an oxygen self-rescuer according to the present invention.

Referring to the drawings, FIG. 1 shows a schematic view of a first exemplary embodiment of an oxygen self-rescuer 100 according to the present invention.

The oxygen self-rescuer 100 comprises a gas cartridge 110, a mouthpiece 120, a tube 130 connecting the gas cartridge 110 and the mouthpiece 120, as well as a breathing bag 140 and a spring assembly 150.

The gas cartridge 110 has a gas outlet 112, which guides a gas to be provided by the gas cartridge into the breathing bag 140. The precise structure of the gas cartridge 110 is known to the person skilled in the art and will therefore not be explained in detail here.

The mouthpiece 120 may be a mouthpiece, which is placed only over the mouth of a user of the oxygen self-rescuer 100, or the mouthpiece 120 may be a mouthpiece that is placed over the mouth and nose of the user of the oxygen self-rescuer 100.

In the exemplary embodiment shown, the mouthpiece 120 and the tube 130 are formed together in one piece from a flexible material, for example, from a plastic, especially from an elastomer. In an alternative exemplary embodiment, the mouthpiece is arranged via a suitable device at the tube, wherein the tube and/or the mouthpiece are preferably at least partially formed from a flexible material, for example, from a plastic, especially from an elastomer.

The breathing bag 140 is permanently fastened (fixed), preferably fastened in an airtight manner, especially bonded or connected in a positive-locking manner, to a housing 114 of the gas cartridge 110 in the exemplary embodiment shown. The fastening is in this case arranged at the housing 114 such that the gas to be provided reaches the breathing bag 140 through the gas outlet 112 in order to then reach the user of the oxygen self-rescuer 100 via the tube 130 and via the mouthpiece 120. In this sense, the breathing bag 140 is hydrodynamically connected to the gas cartridge 110 and to the tube 130.

The spring assembly 150 is located within the breathing bag 140 according to the present invention. The spring assembly 150 comprises, in the exemplary embodiment shown, at least of a first leg 151 of the spring assembly and a second leg 152 of the spring assembly 150, wherein the two legs 151, 152 are connected to one another via a torsion spring 153. In an exemplary embodiment, not shown, the spring assembly comprises a compression spring. In the exemplary embodiment shown, the spring assembly 150 is permanently fastened to the housing 114 of the gas cartridge 110 via the first leg 151. The fastening takes place in the exemplary embodiment shown via a screw connection, via a welded connection or via a bonding. In the second exemplary embodiment shown in FIG. 6, the spring assembly is, as an alternative or in addition, fastened to the breathing bag.

Figure 2:
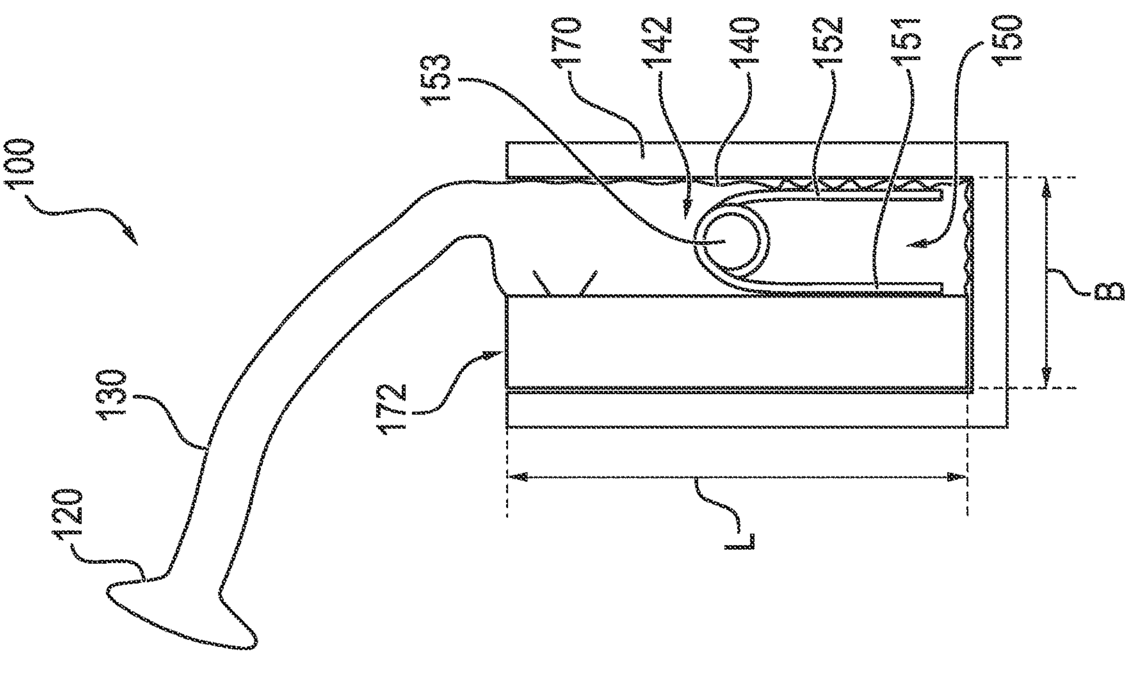
FIG. 2 is a schematic view of the first exemplary embodiment of the oxygen self-rescuer according to the present invention in the packed-up state with casing.

The spring assembly 150 is configured such that it is present in a pretensioned spring state in an unused packed-up state of the oxygen self-rescuer, as it is shown, for example, in FIG. 2. In this case, the spring assembly 150 leaves the pretensioned spring state during an externally triggered transition from the unused packed-up state of the oxygen self-rescuer 100 into a use expanded state of the oxygen self-rescuer 100 such that the spring assembly uplifts the breathing bag 140 and in the process generates a vacuum within the breathing bag 140. FIG. 1 shows precisely the state, in which the breathing bag 140 is tilted up (uplifted) especially by the spring assembly 150 via the second leg 152. Due to this uplifting of the breathing bag 140, a vacuum is generated, which guides breathable gas into the breathing bag 140 and as a result prepares this breathing bag for a ventilation of a user of the oxygen self-rescuer 100.

In the state of the spring assembly 150 shown in FIG. 1, the second leg 152 now moves away from the first leg 151 towards the gas outlet 112. The precise course of the movement is explained in combination with FIGS. 2 and 3.

The pretension is generated in the case of the spring assembly 150 shown by the two legs 151, 152 being moved towards one another such that the torsion spring 153 is pretensioned. The movement towards the expanded state of the oxygen self-rescuer 100 takes place here by a movement of the two legs 151, 152 towards one another such that the torsion spring 153 is finally in a relaxed state.

According to the present invention, the spring assembly consists of at least one spring. Two opposing torsion springs, which are located one behind the other because of the lateral schematic view, are used in the exemplary embodiment shown. The possible structure of the spring assembly 150 is shown, for example, by FIG. 4 or 5. The spring assembly 150 preferably has a one-piece configuration made of a metallic wire.

In the exemplary embodiment shown, the vacuum in the breathing bag 140, which is generated by the uplifting of the spring assembly 150, is compensated for by breathable gas being drawn into the breathing bag 140 from the surrounding area 160 through the mouthpiece 120 and the tube 130.

In the exemplary embodiment shown, the two legs 151, 152 are each at least 5 cm long, especially at least 10 cm long, and preferably at least 15 cm long. A certain length of the two legs 151, 152 is necessary to provide a gas volume within the breathing bag 140 which is sufficient for an inhaled breath of the user of the oxygen self-rescuer 100.

After inhaling the breathable gas provided, the user would breathe back into the breathing bag and in the process the oxygen-containing gas provided by the gas cartridge 110 would be added to the exhaled air. In addition, some of the gas within the breathing bag, i.e., especially some of the gas exhaled by the user, can again leave the gas circuit of the oxygen self-rescuer 100 via an additional overpressure valve, not shown, at the breathing bag 140.

Figure 3:
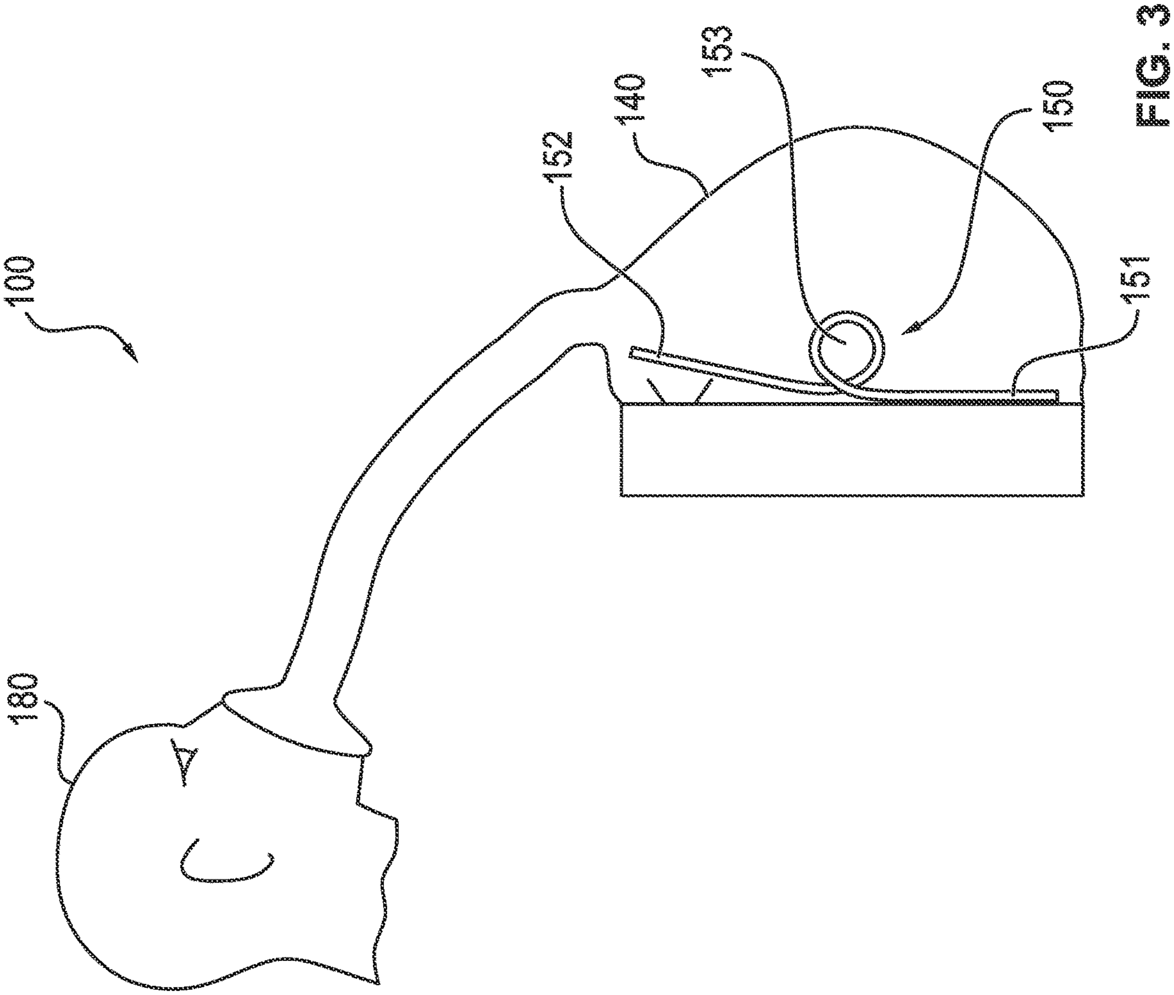
FIG. 3 is a schematic view of the first exemplary embodiment of the oxygen self-rescuer according to the present invention in the relaxed state of the spring assembly of the oxygen self-rescuer.

FIGS. 2 and 3 show a respective schematic view of the first exemplary embodiment of the oxygen self-rescuer 100 according to the present invention in the packed-up state with casing 170 (FIG. 2) and in the relaxed state of the spring assembly 150 of the oxygen self-rescuer 100 (FIG. 3).

The packed-up state shown in FIG. 2 is the state that is present over the years during storage and during the work with the oxygen self-rescuer without a corresponding alarm situation, which would indicate a use of the oxygen self-rescuer. Only the mouthpiece 120 and the tube 130 are preferably also arranged within the casing 170 and are shown here in the removed state only for the sake of clarity. The casing 170 is shown schematically. In the exemplary embodiment being shown, it is a canister, especially a canister made of metal or plastic. In an exemplary embodiment, not shown, the casing is a closable bag, a closable box or the like.

In this packed-up state, the spring assembly 150 is present in the pretensioned spring state. This pretensioned spring state is characterized in the exemplary embodiment shown in that the two legs 151, 152 are bent towards one another and correspondingly point in the same direction. As a result, there is an especially low inner volume 142 of the breathing bag 140. This low inner volume 142 makes possible a low packed size of the oxygen self-rescuer 100, so that this oxygen self-rescuer can thereby be arranged in the internal area 172 of the casing 170 in the first place. After arranging the oxygen self-rescuer 170 within the internal area 172 of the casing 170, the spring assembly 150 can no longer leave the pretensioned spring state shown, since the spring action acts against the casing 170 via the breathing bag 140 and this casing 170 is strong enough to withstand this spring action.

The length L of the oxygen self-rescuer 100 in the unused packed-up state is less than 50 cm, especially less than 30 cm, preferably less than 20 cm. The width B of the oxygen self-rescuer 100 in the unused packed-up state is less than 20 cm, especially less than 15 cm, preferably less than 10 cm. The depth of the oxygen self-rescuer 100 in the unused packed-up state, which depth is not shown because of the perspective shown, is less than 30 cm, especially less than 20 cm, preferably less than 16 cm.

The spring assembly 150 is able to leave the pretensioned spring state only by a manual triggering of the transition from the unused packed-up state according to FIG. 2 into the use expanded state according to FIG. 3. This externally triggered transition is preferably achieved by the manual pulling out of the oxygen self-rescuer 100 from the casing 170. In an exemplary embodiment, not shown, a rigid strap only partially enclosing the oxygen self-rescuer, which is pulled off from the oxygen self-rescuer in case of an alarm and thereby triggers the transition from the unused packed-up state into the use expanded state, is used instead of the casing.

After the pulling out of the oxygen self-rescuer 100 from the casing 170, the spring assembly 150 leaves the pretensioned spring state by the second leg 152 moving away from the first leg 151 because of the spring action of the torsion spring 153. As a result, the spring assembly 150 hence leaves the pretensioned state, in which the two legs 151, 152 are configured as acute-angled to one another and moves via the state shown in FIG. 1 to the final relaxed state of the spring assembly 150, which is shown in FIG. 3. In this final relaxed state, the two legs 151, 152 are obtuse-angled or stretched toward one another in the relaxed spring state.

Furthermore, it can be seen that the breathing bag 140 in the relaxed spring state is not uplifted by the spring assembly 150. This is especially advantageous since the user 180 does not hereby have to breathe against a resistance caused by the spring assembly 150 during the intuitive inhalation of the gas within the breathing bag 140, as this could be the case, for example, in the state of the spring assembly 150 shown in FIG. 1.

Figure 5:
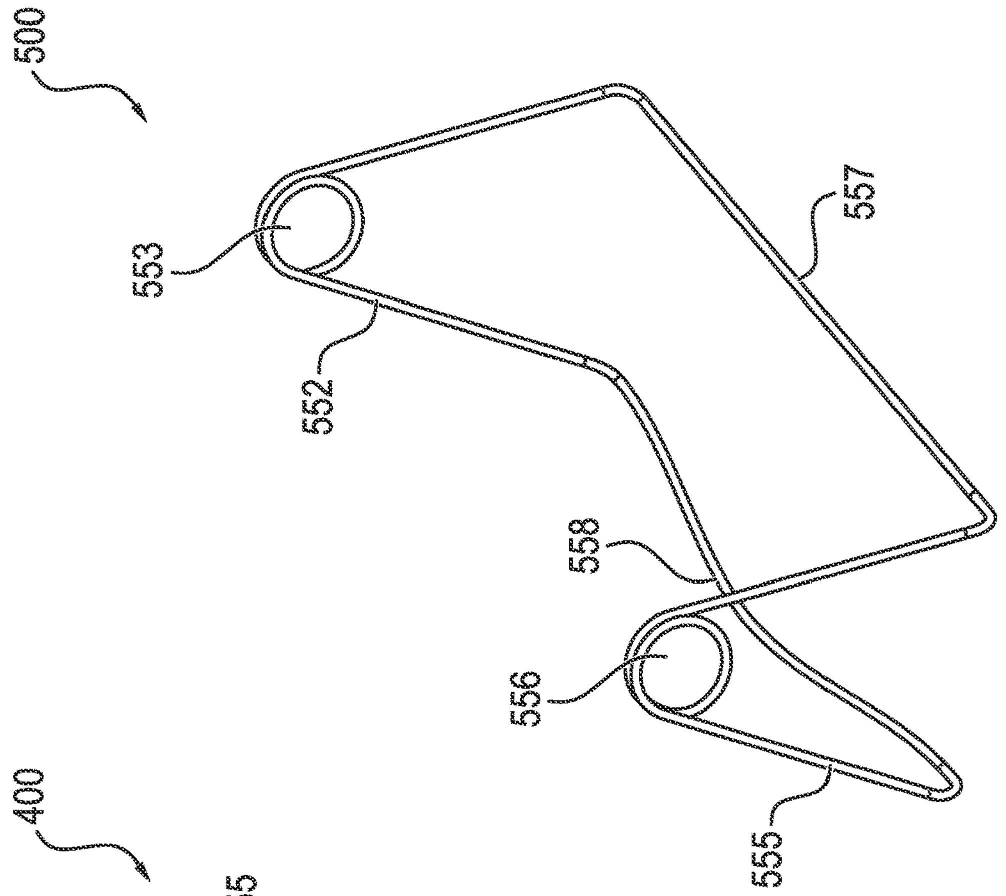
FIG. 5 is a schematic view of a spring assembly according to the present invention, wherein the spring assembly between two springs of a pair of springs is arched (arcuate)
Figure 4:
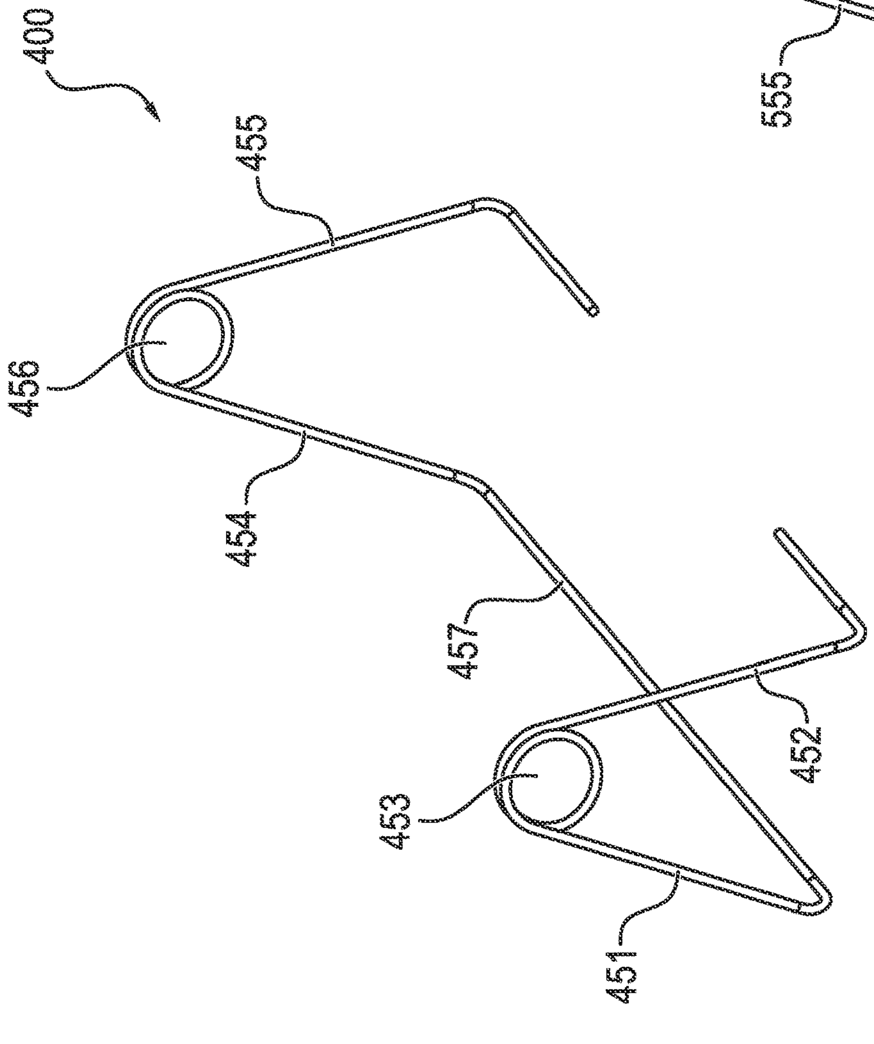
FIG. 4 is a schematic view of a spring assembly according to the present invention, wherein the spring assembly between two springs of a pair of springs is rectangular.

FIGS. 4 and 5 show a respective schematic view of a spring assembly 400, 500 according to the present invention, wherein the spring assembly 400 is rectangular (FIG. 4) and arched (FIG. 5), respectively, between two springs 453, 456, 553, 556 of a pair of springs.

The spring assembly 400 from FIG. 4 is characterized in that two torsion springs 453, 456, which are connected to one another via two legs 451, 454 and a rectangular structure 457 located between them, are located opposite one another. As a result, the two torsion springs 453, 456 form a pair of springs of this spring assembly 400. The two legs 453, 455 of the two torsion springs 453, 456, which point away from the rectangular structure 457, are not connected to one another. In case of the similar spring assembly 150 of the oxygen self-rescuer 100 from FIG. 1, these two legs 452, 455 are screwed, bonded or connected in a different way to the housing of the gas cartridge. In another exemplary embodiment, these two legs 452, 455 of the pair of springs are bonded, stitched or connected in a different way to the breathing bag.

The spring assembly 500 from FIG. 5 is characterized in that, as already described for the spring assembly 400, two torsion springs 553, 556, which are connected to one another via a rectangular structure 557, are, in turn, located opposite one another. The only difference compared to the spring assembly 400 is that the two other legs 452, 455 are connected to one another via another structure, namely via an arched structure 558. Due to the structure of the spring assembly 500, it is avoided that there is a concentrated stressing of the breathing bag and/or of the gas cartridge, especially of the housing of the gas cartridge. Rather, a more uniform application of the spring action present is ensured via the corresponding structure between the legs of a respective spring.

A pretensioned spring state of the respective spring assembly 400, 500 is shown in FIGS. 4 and 5, respectively.

The two spring assemblies 400 and 500 are each formed by a metallic wire. The present invention can, in principle, also be embodied by spring assemblies having different shapes, wherein the spring assembly according to the present invention must be able to maintain the pretensioned spring state over a long period of time without structural damage to the springs and finally to bring about uplifting of the breathing bag after the externally triggered transition. The spring assembly according to the present invention is preferably formed partially from a metal.

The two spring assemblies shown in FIGS. 4 and 5 have a one-piece configuration.

Figure 6:
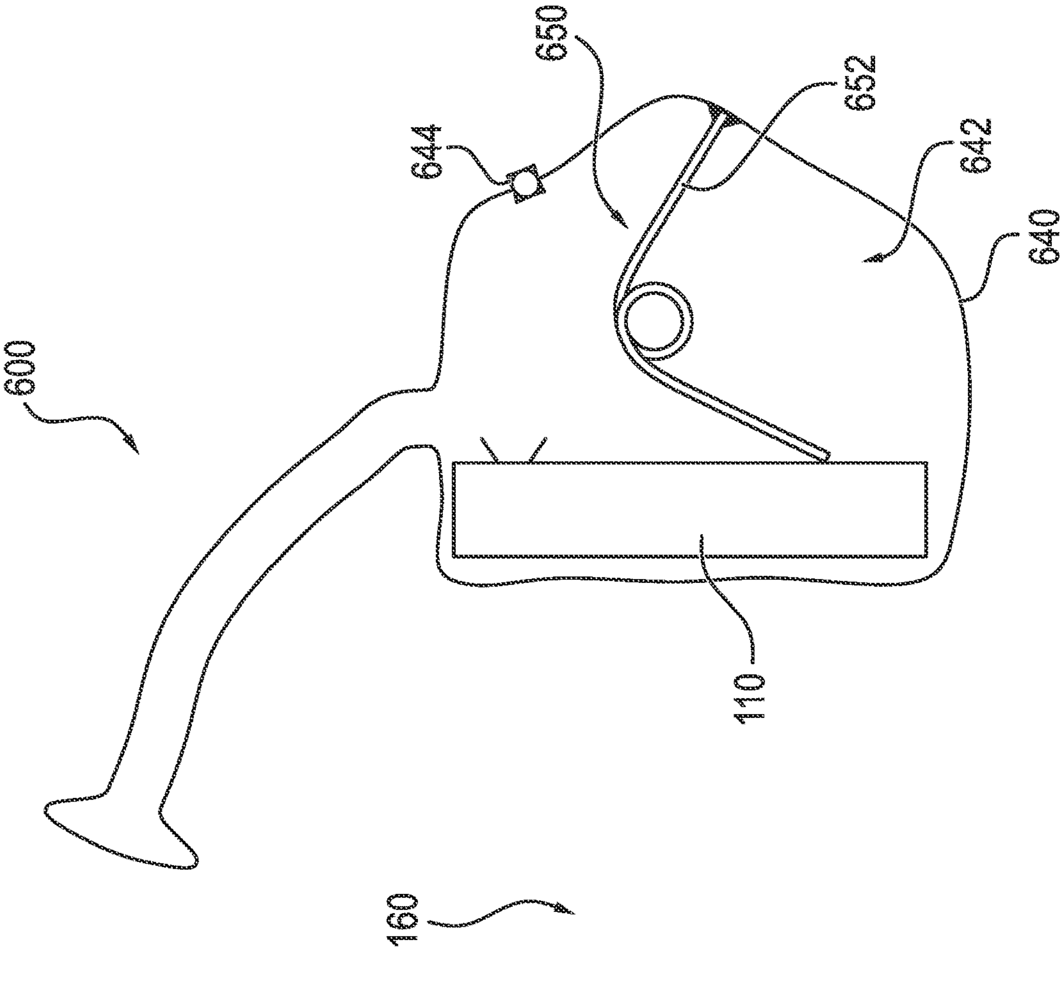
FIG. 6 is a schematic view of a second exemplary embodiment of an oxygen self-rescuer according to the present invention.

FIG. 6 shows a schematic view of a second exemplary embodiment of an oxygen self-rescuer 600 according to the present invention.

The oxygen self-rescuer 600 differs from the oxygen self-rescuer 100 shown in FIG. 1 by the spring assembly 650 being connected to the breathing bag 640. This connection is embodied via a seam in the exemplary embodiment shown. In this case, the breathing bag 640 is stitched to the second leg 652. In an exemplary embodiment, not shown, a connection takes place between the spring assembly and the breathing bag via a bonding or via a different connection. In the exemplary embodiment shown, the spring assembly 650 is not connected to the gas cartridge 110. The spring assembly in an exemplary embodiment, not shown, is connected both to the breathing bag and to the gas cartridge of the oxygen self-rescuer.

Furthermore, the oxygen self-rescuer 600 differs from the oxygen self-rescuer 100 by the breathing bag 640 enclosing the entire gas cartridge 110. Thus, the gas cartridge 110 is located in the inner volume 642 of the breathing bag 640. Via a connection, not shown, between the breathing bag 640 and the gas cartridge 110, the gas cartridge 110 is held in a predefined position in relation to the breathing bag 640. In one exemplary embodiment, not shown, the gas cartridge is located within the breathing bag without permanent connection to the breathing bag.

Finally, the oxygen self-rescuer 600 differs from the oxygen self-rescuer 100 by the breathing bag 640 having a breathing bag valve 644, which is an overpressure valve and a vacuum valve at the same time. The vacuum valve makes possible a guiding (drawing) of the breathable gas from the surrounding area 160 via the breathing bag valve 644 into the breathing bag 640, while the spring assembly 650 uplifts the breathing bag 640 from the pretensioned spring state. As a result, a vacuum is generated in the breathing bag 640, which leads to an opening of the vacuum valve starting from a predefined threshold value. During the ventilation of the user after the initial uplifting (tilting up) of the breathing bag, both the exhaled air of the user and the oxygen-containing gas provided via the gas cartridge 110 are brought into the breathing bag 640, so that a possible overpressure within the breathing bag 640 is advantageously avoided by the overpressure valve of the breathing bag valve 644.

Figure 7:
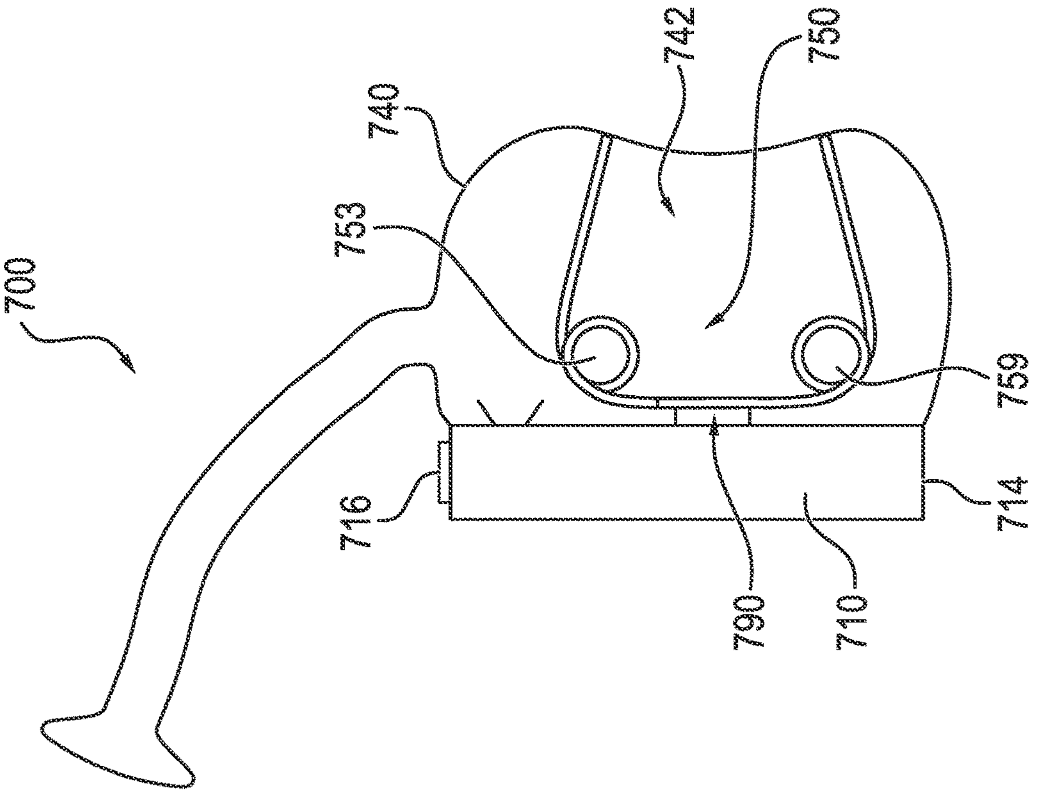
FIG. 7 is a schematic view of a third exemplary embodiment of an oxygen self-rescuer according to the present invention.

FIG. 7 shows a schematic view of a third exemplary embodiment of an oxygen self-rescuer 700 according to the present invention.

The oxygen self-rescuer 700 differs from the oxygen self-rescuer 100 shown in FIG. 1 by the spring assembly 750 having two pairs of springs of torsion springs 753, 759 located opposite one another. An additional torsion spring each is located behind the torsion springs 753, 759 shown in the manner as it is shown in FIGS. 4 and 5. Therefore, the spring assembly 750 comprises four torsion springs 753, 759. The unfolding of the two opposing pairs of legs achieved thereby makes possible in an especially reliable manner the provision of a uplifted breathing bag 740 with a corresponding gas volume of breathable gas. Thus, it is avoided via the two pairs of legs that the breathing bag is bonded to the spring assembly, as a result of which the inner volume 742 of the breathing bag 740 would be reduced. The spring assembly 750 is in the exemplary embodiment shown fastened via a connecting structure 790 to the gas cartridge 710, especially to the housing 714 of the gas cartridge 710. The connecting structure 790 is bonded, welded, screwed or fastened in a different way to the gas cartridge 710. The connecting structure 790 may comprise, for example, a fastening rail or a system of fastening rails.

Furthermore, the oxygen self-rescuer 700 differs from the oxygen self-rescuer 100 by the gas cartridge 710 being operated manually via a user interface 716. In the exemplary embodiment shown, the user interface 716 is a button. In an exemplary embodiment, not shown, such a user interface of the gas cartridge is a switch, for example, a toggle switch, or a rotatable adjusting wheel.

In one exemplary embodiment, not shown, the spring assembly comprises a plurality of spring components, which are fastened to the breathing bag separately from one another in the breathing bag, which have each at least one spring. Such an additional spring component may additionally support the remaining spring assembly of the type shown in FIGS. 4 and 5 in that it uplifts, for example, a different area of the breathing bag.

Figure 8:
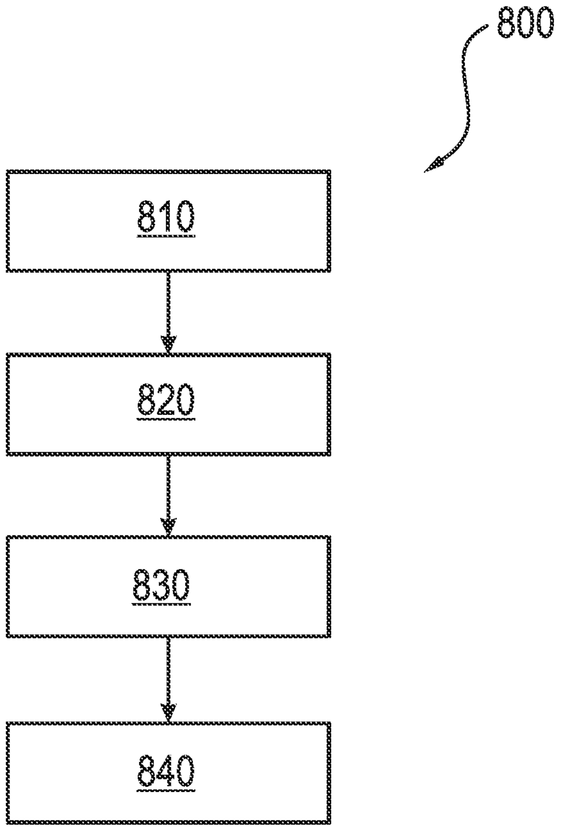
FIG. 8 is a flow chart of an exemplary embodiment of a process according to the present invention according to another aspect of the present invention.

FIG. 8 shows a flow chart of an exemplary embodiment of a process 800 according to the present invention according to another aspect of the present invention.

The process 800 according to the present invention is configured for setting up a breathing bag of an oxygen self-rescuer during the transition from an unused packed-up state of the oxygen self-rescuer into a use expanded state of the oxygen self-rescuer. In this case, it has the process steps described below.

A first step 810 comprises a provision of a spring assembly in a pretensioned spring state of the spring assembly within the breathing bag for the unused packed-up state of the oxygen self-rescuer.

A next step 820 comprises a fixing of the oxygen self-rescuer in the unused packed-up state.

A next step 830 comprises a triggering of the transition into the use expanded state of the oxygen self-rescuer.

A final step 830 immediately following step 830 comprises an automated leaving of the pretensioned spring state by the spring assembly because of a spring action of at least one spring of the spring assembly such that the spring assembly uplifts the breathing bag and in the process generates a vacuum within the breathing bag, so that the vacuum guides breathable gas into the breathing bag and as a result prepares this breathing bag for a ventilation of a user of the oxygen self-rescuer.

Within the framework of the process according to the present invention, the steps 810, 820, 830, 840 described always follow one another in the sequence shown. Steps 810 and 820 are preferably carried out immediately after one another. Thus, after the provision of the spring assembly in the pretensioned state, this state is fixed within the framework of the unused packed-up state. These two steps can be carried out by the manufacturer of the oxygen self-rescuer within the framework of production. As an alternative or in addition, the two steps 810 and 820 may be carried out after a use of the oxygen self-rescuer in order to make this oxygen self-rescuer ready for use again.

Several years may pass between step 820 and step 830. In case the oxygen self-rescuer is not used, the final steps 830 and 840 will not be carried out at all after steps 810 and 820. Step 830 is carried out only in the case of a use of the oxygen self-rescuer, for example, because of an alarm at the working area, for example, in a mine. In order to protect the user of the oxygen self-rescuer against the danger of, for example, toxic gases in the surrounding area, a brief ventilation of the user shall be made possible due to the triggering of the transition into the use expanded state.

Step 840 is carried out in an automated manner immediately after step 830, since the spring assembly is no longer held in the pretensioned spring state, so that it leaves this pretensioned state and as a result uplifts the breathing bag.

As a result, breathable gas can be provided in the breathing bag in a rapid and reliable manner for the user of the oxygen self-rescuer. Due to the manual or automated activation of the gas cartridge of the oxygen self-rescuer, the gas within the breathing bag is enriched with oxygen.

In an especially preferred exemplary embodiment of the process 800 according to the present invention, a final step after step 840 comprises a reaching of a finally present relaxed spring state of the spring assembly, in which the breathing bag is not tilted up (uplifted) by the spring assembly. During this final step, the breathing bag remains tilted up (uplifted) because of the gas guided (drawn) by the vacuum into the breathing bag, without the spring assembly having to support this tilted up (uplifted) position of the breathing bag. Since the spring assembly now no longer uplifts the breathing bag, movement of the breathing bag within the framework of the ventilation can take place, without the spring action of the spring assembly hindering the breathing of the user in the process.

Preferably less than 10 sec, especially less than 8 sec, especially preferably less than 5 sec will pass between step 840 and the reaching of the relaxed spring state.

While specific embodiments of the invention have been shown and described in detail to illustrate the application of the principles of the invention, it will be understood that the invention may be embodied otherwise without departing from such principles.

LIST OF REFERENCE CHARACTERS

100, 600, 700 Oxygen self-rescuer
110, 710 Gas cartridge
112 Gas outlet
114, 714 Housing
120 Mouthpiece
130 Tube
140, 640, 740 Breathing bag
142, 642, 742 Inner volume of the breathing bag
150, 400, 500, 650, 750 Spring assembly
151, 451 First leg of the spring assembly
152, 452, 552, 652 Second leg of the spring assembly
153, 453, 553, 753 Torsion spring
160 Surrounding area
170 Casing
172 Internal area of the casing
180 User
456, 556 Additional torsion spring
454 Additional first leg
455, 555 Additional second leg
457, 557 Rectangular structure
558 Arched structure
644 Breathing bag valve
716 User interface
759 Additional torsion spring of an additional pair of springs
790 Connecting structure
800 Process
810, 820, 830, 840 Process steps
L Length of the oxygen self-rescuer
B Width of the oxygen self-rescuer

What is claimed is:

1. An oxygen self-rescuer comprising:
a gas cartridge;
a mouthpiece;
a tube connecting the gas cartridge and the mouthpiece;
a breathing bag hydrodynamically connected to the gas cartridge and to the tube; and
a spring assembly within the breathing bag and comprising at least one spring fastened to at least one of the breathing bag and the gas cartridge, wherein
the spring assembly is in a pretensioned spring state in an unused packed-up state of the oxygen self-rescuer;
the spring assembly is configured to be externally triggered to transition from the pretensioned spring state of the unused packed-up state of the oxygen self-rescuer into an expanded spring state of a use expanded state of the oxygen self-rescuer whereby the transition of the spring assembly acts on the breathing bag to uplift the breathing bag to generate a vacuum within the breathing bag to draw breathable gas into the breathing bag to prepare the breathing bag for a ventilation of a user of the oxygen self-rescuer;
the spring assembly is configured to uplift the breathing bag between the pretensioned spring state and a relaxed spring state of the spring assembly; and
the breathing bag is not uplifted by the spring assembly in the relaxed spring state of the use expanded state.

2. The oxygen self-rescuer in accordance with claim 1, wherein the spring assembly has a flat shape in the pretensioned spring state such that a low inner volume of the breathing bag, compared to the use expanded state, is supported by the pretensioned state, to present a packed size of the oxygen self-rescuer in the unused packed-up state that is smaller than an expanded size of the expanded state.

3. The oxygen self-rescuer in accordance with claim 1, wherein:
the spring assembly comprises a torsion spring and legs, the legs being movable in relation to one another;
the movable legs are arranged, in the pretensioned spring state, relative to one another such that the torsion spring, arranged between the legs is in a pretensioned state; and
the legs are configured to move in relation to one another during the transition from the pretensioned spring state into the relaxed spring state such that the torsion spring reaches the relaxed state.

4. The oxygen self-rescuer in accordance with claim 3, wherein:
the legs are configured at an acute-angle to one another in the pretensioned spring state; and
the two legs are configured at an obtuse-angle to one another in the relaxed spring state.

5. The oxygen self-rescuer in accordance with claim 1, wherein the spring assembly comprises two opposing torsion springs which form a pair of springs of the spring assembly.

6. The oxygen self-rescuer in accordance with claim 5, wherein the spring assembly comprises at least two pairs of springs.

7. The oxygen self-rescuer in accordance with claim 5, wherein the spring assembly between the two springs of at least one pair of springs has an arched, triangular, rectangular or U-shaped configuration.

8. The oxygen self-rescuer in accordance with claim 1, wherein the spring assembly has a one-piece configuration.

9. The oxygen self-rescuer in accordance with claim 1, wherein the spring assembly is fastened to a housing of the gas cartridge.

10. The oxygen self-rescuer in accordance with claim 1, wherein the vacuum is configured to draw breathable gas into the breathing bag via at least one of the mouthpiece, the gas cartridge and a breathing bag valve.

11. A process for setting up a breathing bag of an oxygen self-rescuer during a transition from an unused packed-up state of the oxygen self-rescuer into a use expanded state of the oxygen self-rescuer, the process comprising the steps of:
providing a gas cartridge, a mouthpiece, a tube connecting the gas cartridge and the mouthpiece, a breathing bag hydrodynamically connected to the gas cartridge and to the tube, and a spring assembly;
providing the spring assembly in a pretensioned spring state of the spring assembly within the breathing bag to form the unused packed-up state of the oxygen self-rescuer;
fixing of the oxygen self-rescuer in the unused packed-up state;
triggering of a transition into the use expanded state of the oxygen self-rescuer;
upon triggering, transitioning the pretensioned spring state of the spring assembly based on a spring action of at least one spring of the spring assembly such that the spring assembly uplifts the breathing bag and generates a vacuum within the breathing bag, such that the vacuum draws breathable gas into the breathing bag and as a result prepares the breathing bag for a ventilation of a user of the oxygen self-rescuer; and reaching a finally present relaxed spring state of the spring assembly, in which the breathing bag is not uplifted by the spring assembly.

12. The process in accordance with claim 11, wherein the spring assembly has a flat shape in the pretensioned spring state such that a low inner volume of the breathing bag, compared to the use expanded state, is supported by the pretensioned state, to present a packed size of the oxygen self-rescuer in the unused packed-up state that is smaller than an expanded size of the expanded state.

13. The process in accordance with claim 11, wherein:

the spring assembly comprises a torsion spring and legs, the legs being movable in relation to one another;

the movable legs are arranged, in the pretensioned spring state, relative to one another such that the torsion spring, arranged between the legs is in a pretensioned state; and the legs move in relation to one another during the transition from the pretensioned spring state into the relaxed spring state such that the torsion spring reaches the relaxed state.

14. The process in accordance with claim 13, wherein:

the legs are configured at an acute-angle to one another in the pretensioned spring state; and the legs are configured at an obtuse-angled to one another in the relaxed spring state.

15. The process in accordance with claim 11, wherein the spring assembly comprises two opposing torsion springs which form a pair of springs of the spring assembly.

16. The process in accordance with claim 15, wherein the spring assembly comprises at least two pairs of springs.

17. The process in accordance with claim 11, wherein the vacuum draws breathable gas into the breathing bag via at least one of the mouthpiece, the gas cartridge and a breathing bag valve.

* * * * *